March 17, 1936.  O. F. ROHWEDDER  2,034,250

SLICING MACHINE

Filed Sept. 27, 1934

INVENTOR
Otto F. Rohwedder
BY Evans & McCoy
ATTORNEYS

Patented Mar. 17, 1936

2,034,250

UNITED STATES PATENT OFFICE 2,034,250

SLICING MACHINE

Otto F. Rohwedder, Davenport, Iowa, assignor to The Micro Corporation, Bettendorf, Iowa, a corporation of Delaware Application September 27, 1934, Serial No. 745,732

12 Claims. (Cl. 146—153)

This invention relates to slicing machines and more particularly to slicing machines for commercially slicing bread and other bakery products.

In slicing machines employed in the commercial slicing of baked bread and other bakery products, and which include one or more cutters of the band or blade type, the cutter is relatively thin and has the tendency during the slicing operation to vibrate or deflect, due partially to the character of the article being sliced, and produce a wavy slice. Heretofore it has been the practice to provide one or more guides consisting merely of a slotted member in which the cutter has a sliding fit. Such guides, however, have not proven to be very satisfactory, partly because of the difficulty of obtaining suitable guide slots.

The primary object of the present invention is to provide new and improved cutter guiding means and the arrangement of the same which is more efficient in operation and which will satisfactorily prevent vibration, deflection and twisting of the cutters.

A further object is to provide a blade guiding means for slicing machines of such construction that should it become desirable or necessary to replace a set of blades of one blade thickness with a set of blades of a greater or lesser thickness, the guides may be readily adjusted to compensate for the change in blade thickness.

The invention is also directed to slicing machines having a single or a plurality of cutters, which may be of the band or reciprocable blade type. The invention also contemplates a construction in which the guide means is adjustable and may also form a part of the machine which supports the article during the slicing operation.

With the above and other objects in view, the present invention consists of certain features of construction and combinations of parts to be hereinafter described with reference to the accompanying drawing, and then claimed.

In the drawing which illustrates a suitable embodiment of the invention in connection with a reciprocable blade type slicing machine, Figure 1 is a fragmentary vertical section through a reciprocable multiple blade type slicing machine, showing the guide means associated with the cutters;

Figure 3:
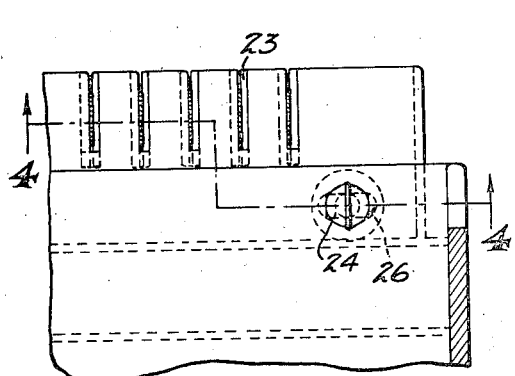
Fig. 3 is an enlarged fragmentary section taken approximately on line 3—3 of Fig. 1.

Referring to the drawing in which like numerals refer to like parts throughout the several views, the slicing machine illustrated is of the reciprocable blade type comprising spaced side frames 10 which are connected together at their upper ends by spaced cross pieces 11 between which a pair of blade carrying frames 13 are arranged to be reciprocated.

As is well known practice in bread slicing machines, each blade frame carries a series of spaced relatively thin cutting blades 14 under suitable tension, each blade 14 of one blade frame being disposed between adjacent blades of the other frame so that the cutting edges will be in alignment for simultaneous initial engagement with the article to be sliced thereby.

In the machine shown in the drawing, the bread or other article being sliced is fed by gravity or any other suitable means along an inclined feed table 15 which terminates adjacent the cutting edges of the blades 14, and then moves onto an inclined transfer plate 16 from which it may move to a discharge conveyor 17.

It is to be understood, however, that the feed table may be horizontal and extend through the cutters to replace the transfer plate, in which case slots would be provided for the cutters, and that the discharge conveyor may be eliminated.

In the construction shown in the drawing the transfer plate 16 terminates adjacent the non-cutting edges of the cutter blades 14 and is provided with end flanges 18 which are formed with outwardly extending portions 19 secured by means of thumb screws 20 to the side frames 10 so that the transfer plate may be easily removed when it is desired to remove the blade frames 13. In the construction here shown, I have provided two blade guide devices, one to be associated with the cutter blades immediately below the article being sliced and the other to be associated with the cutter blades immediately above the article being sliced. However, one or the other of the devices may be omitted, if desired.

Figure 4:
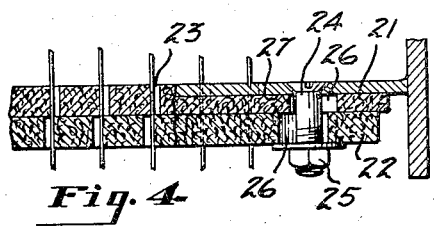
Fig. 4 is a section taken approximately on line 4—4 of Fig. 3.

Each of the blade guide devices, as more clearly shown in Figures 3 and 4, comprises a pair of rectangular elements 21 and 22 of suitable material, preferably non-metallic, such as "Bakelite", each having a plurality of slots 23 corresponding in number to the number of cutter blades 14, and each slot being of considerably greater width than the thickness of the cutter blade.

These elements 21 and 22 are superposed and secured together at their ends by suitable bolts 24 having nuts 25 threaded thereonto, the openings 26, however, through which the bolts 24 extend are in the form of elongated slots extending longitudinally of the elements 21 and 22 to permit longitudinal relative adjustment of elements 21 and 22.

When the elements 21 and 22 are assembled to the machine in association with the cutters 14, one side wall of each slot 23 of one element is disposed substantially in engagement with one side of the corresponding cutter blade 14, whereas the opposite side wall of the corresponding slot 23 of the other element is disposed substantially in engagement with the other side of the blade 14. Then, the elements 21 and 22 are adjusted relative to each other to obtain the proper degree of engagement of the side walls of the slots 23 with the cutter blades. In practice, the blades 14 should engage the slot side walls with a sliding or running fit, but not to such an extent as to cause bending or binding of the blade.

It is obvious that by having the cutter blades in running engagement with one element at one side and with the other element at the opposite side, any desired degree of pressure can be obtained to insure that the blades will be efficiently guided.

Cutter blades used in bread slicing machines are frequently as thin as .015" and in guides heretofore known in which a series of slots were merely formed in a guide bar, it has been practically impossible to cut slots which were narrow enough to act as efficient guides for the thin cutter blades. In the blade guide of the present invention, the slots in each guide element are relatively wide and can be more easily and more accurately formed.

The blade guide device to be associated below the article being sliced, is in the construction shown in the drawing, mounted on the transfer plate 16 and extends through the cutters to the edge of the feed table 15, the upper surface of the upper guide element being recessed at 27 to receive the forward edge of the transfer plate 16 in order that the surfaces of the plate 16 and guide element 21 will be flush with each other. The bolts 24 which receive the guide elements together being carried, as shown in Fig. 4, by the transfer plate 16 in countersunk openings. It will be noted here that the blade guide device forms a continuation of the transfer plate and supports the article during the slicing operation. It is to be understood, however, that either the plate 16 or feed table 15 may extend through the cutter blades, in which case the guide device will be mounted below the extended portion.

Figure 1:
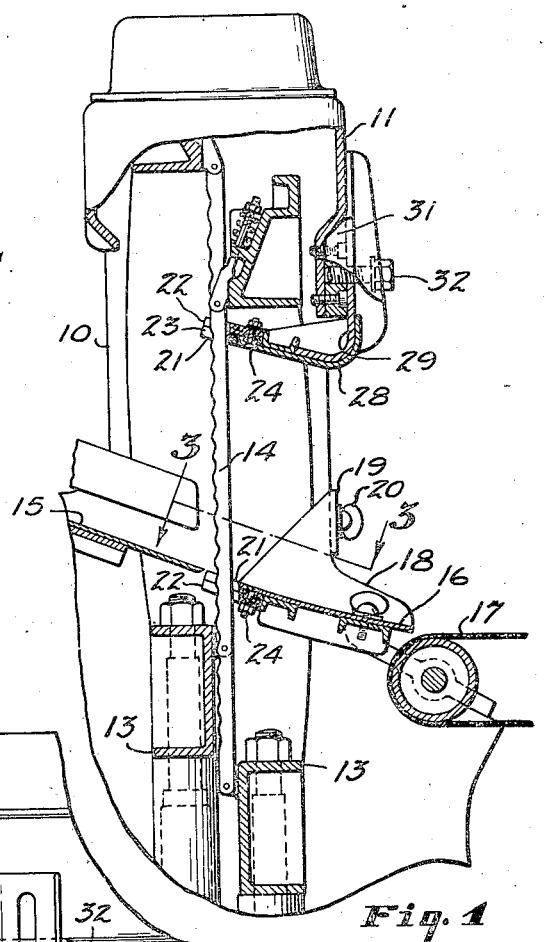
Figure 2:
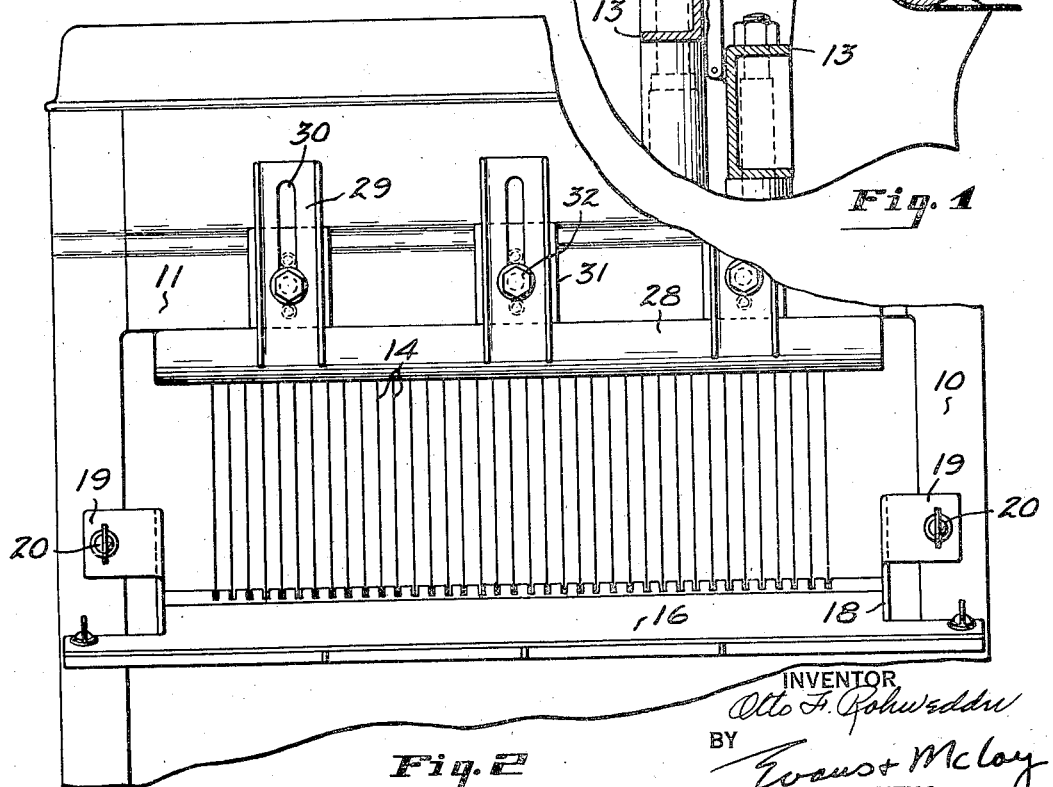
Fig. 2 is an end elevation of the slicing machine, looking in the direction of the arrows 2—2 of Fig. 1.

The other blade guide device, as shown in Figs. 1 and 2, is mounted above the transfer plate in spaced relation, upon a suitable plate like element 28 which is secured to a series of brackets 29, each having an elongated slot 30 therein. These brackets are mounted to slide for vertical adjustment in channeled slides 31 secured to one of the frame cross pieces 11. Cap screws 32 are provided to extend through the slots 30 and to secure the arms 29 in the desired adjusted position.

The guide elements are secured to the upper side of plate 28, and the securing bolts 24 for these upper guide elements are carried by the plate 28, as shown in Fig. 1.

Vertical adjustment of the brackets 29 is provided so that the guide device may be moved to a position as close as practicable to the upper side of the article being sliced.

The blade guide devices described provides an improved means for guiding the cutter blades of a bread slicing machine and preventing deflection and twisting of the same, inasmuch as the proper degree of sliding engagement between the cutters and guides can be easily obtained.

By firmly guiding the cutter blades by the use of the improved guide device of the present invention, it is not necessary in the case of the reciprocable blade type machine, to place the blades under as high a degree of tension as has been necessary heretofore with other types of blade guides. This is particularly advantageous in that the blade frames may be made lighter in weight, which has a tendency to reduce vibration of the machine.

Another advantage of the present invention is that should it become desirable or necessary to replace a set of blades of one blade thickness with a set of blades of a greater or lesser thickness, the guides may be readily adjusted to compensate for the change in blade thickness.

Although a single embodiment of the invention has been herein shown and described it will be understood that numerous details of the construction shown may be altered or omitted without departing from the spirit of this invention as defined in the following claims.

What I claim is:

1. In a slicing machine, a longitudinally movable cutter, and means for guiding and holding said cutter against substantial deflection, comprising a support and a pair of superposed guide elements carried in juxtaposition by said support, each of said guide elements having a slot therein of substantially greater width than said cutter, said cutter substantially having sliding engagement with one side only of the slot of one guide element and with only the opposite side of the slot of the other guide element.

2. In a slicing machine, a longitudinally movable cutter, and means for guiding and holding said cutter against substantial deflection, comprising a support and a pair of superposed guide elements carried by said support, each of said guide elements having a slot therein of substantially greater width than said cutter, said cutter substantially having sliding engagement with one side of the slot of one guide element and with the opposite side of the slot of the other guide element, said guide elements being adjustably movable relative to each other, whereby to adjust the degree of contact of the cutter with said guide elements.

3. In a slicing machine, a longitudinally movable cutter, and means for guiding and holding said cutter against substantial deflection, comprising a support and a pair of superposed guide elements carried by said support, each of said guide elements having a slot therein of substantially greater width than said cutter, said cutter substantially having sliding engagement with one side of the slot of one guide element and with the opposite side of the slot of the other guide element, said guide elements being of non-metallic material and being adjustably movable relative to each other, whereby to adjust the degree of contact of said cutter with said guide elements.

4. In a slicing machine, a plurality of spaced longitudinally movable cutters, and means for guiding and holding said cutters against substantial deflection, comprising a support adjacent said cutters, and a pair of guide elements carried in juxtaposition by said support, each of said guide elements having a plurality of cutter receiving slots corresponding in number to the cutters, said cutters having running engagement with one side face only of the slots of one of said elements and with the opposite side faces only of the slots of the other of said elements.

5. In a slicing machine, a plurality of spaced longitudinally movable cutters, and means for guiding and holding said cutters against substantial deflection, comprising a support adjacent said cutters, and a pair of superposed guide elements carried by said support, each of said guide elements having a plurality of cutter receiving slots corresponding in number to the cutters, said cutters having running engagement with one side face of the slots of one of said elements and with the opposite side faces of the slots of the other of said elements, said guide elements being adjustably movable relative to each other whereby to adjust the degree of contact of said cutters with the sides of said slots.

6. In a slicing machine, a plurality of spaced longitudinally movable cutters, and means for guiding and holding said cutters against substantial deflection, comprising a support adjacent said cutters, and a pair of superposed guide elements carried by said support, each of said guide elements having a plurality of cutter receiving slots corresponding in number to the cutters, said cutters having running engagement with one side face of the slots of one of said elements and with the opposite side faces of the slots of the other of said elements, said guide elements being disposed below the path of feeding movement of the articles to be sliced.

7. In a slicing machine, a plurality of spaced longitudinally movable cutters, and means for guiding and holding said cutters against substantial deflection, comprising a support adjacent said cutters, and a pair of superposed guide elements carried by said support, each of said guide elements having a plurality of cutter receiving slots corresponding in number to the cutters, said cutters having running engagement with one side face of the slots of one of said elements and with the opposite side faces of the slots of the other of said elements, said guide elements being disposed above the path of feeding movement of the articles to be sliced.

8. In a slicing machine, a plurality of spaced longitudinally movable cutters, and means for guiding and holding said cutters against substantial deflection, comprising a support disposed below the path of feeding movement of the articles to be sliced, a support disposed above the path of feeding movement of the articles to be sliced, and a pair of guide elements carried by each of said supports, each of said guide elements having a plurality of cutter receiving slots corresponding in number to the number of said cutters, said cutters having running engagement with one side face of the slots of one of said elements of each pair of said elements and with the opposite side faces of the slots of the other element of each pair of said elements.

9. In a slicing machine, a plurality of spaced longitudinally movable cutters, and means for guiding and holding said cutters against substantial deflection, comprising a support adjacent said cutters, and a pair of superposed guide elements carried by said support substantially in juxtaposition each of said guide elements having a plurality of cutter receiving slots corresponding in number to the cutters, said cutters having running engagement with but one side face of the slots of one of said elements and with the opposite side faces only of the slots of the other of said elements, said support having an article supporting surface.

10. In a slicing machine, a plurality of spaced longitudinally movable cutters, and means for guiding and holding said cutters against substantial deflection, comprising a support adjacent said cutters, and a pair of superposed guide elements carried by said support, each of said guide elements having a plurality of cutter receiving slots corresponding in number to the cutters, said cutters having running engagement with one side face of the slots of one of said elements and with the opposite side faces of the slots of the other of said elements, said support having an article supporting surface and the uppermost of said elements being substantially flush with said surface to substantially form a continuation thereof.

11. In a slicing machine, a plurality of spaced reciprocable cutter blades, means adjacent said blades for supporting an article to be sliced, and means for guiding and holding said blades against substantial deflection comprising a pair of superposed guide elements supported on said first means and forming a continuation thereof, each of said elements having a plurality of blade receiving slots, one side only of the slots of one of said guide elements having bearing contact with one side of said cutter blades and the opposite sides only of the slots of the other of said guide elements having bearing contact with the other sides of said cutter blades.

12. In a slicing machine, a plurality of spaced reciprocable cutter blades, means adjacent said blades for supporting an article to be sliced, and means for guiding and holding said blades against substantial deflection comprising a pair of superposed guide elements supported on said first means, each of said elements having a plurality of blade receiving slots, one side of the slots of one of said guide elements having bearing contact with one side of said cutter blades and the opposite sides of the slots of the other of said guide elements having bearing contact with the other sides of said cutter blades, said guide elements being adjustable longitudinally of each other to obtain proper bearing contact with the opposite sides of said cutter blades.

OTTO F. ROHWEDDER.